(No Model.)
W. H. TURNER.
ATTACHMENT FOR HARVESTERS.
No. 284,778. Patented Sept. 11, 1883.
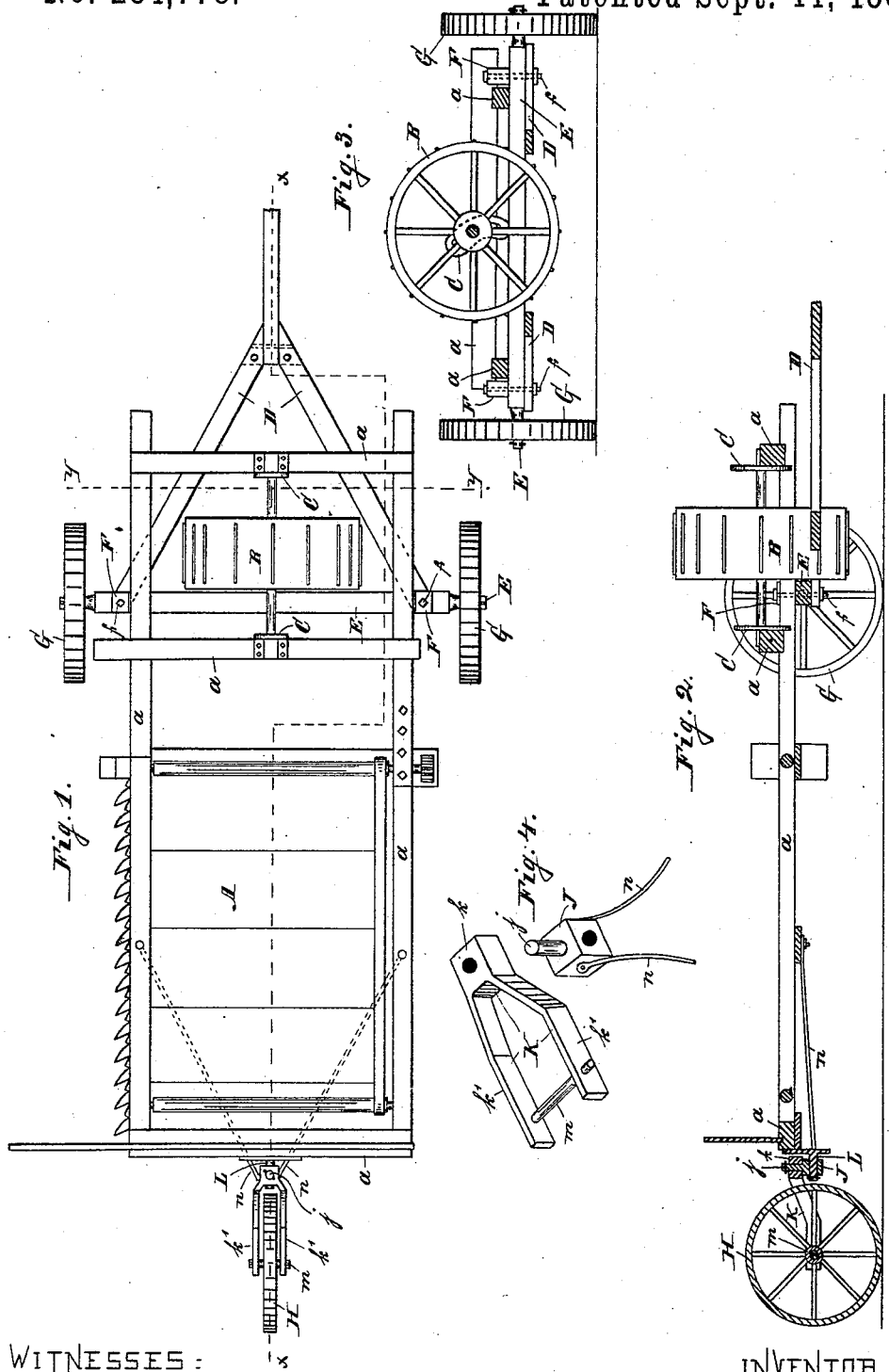
WITNESSES:
Bernh. J. Lizius.
Gottfr. Koehler
INVENTOR:
William H. Turner
Per James B. Lizius & Co.
Attorneys.

UNITED STATES PATENT OFFICE.

WILLIAM H. TURNER, OF INDIANAPOLIS, INDIANA, ASSIGNOR TO THE TURNER TRUCK COMPANY, OF SAME PLACE.

ATTACHMENT FOR HARVESTERS.

SPECIFICATION forming part of Letters Patent No. 284,778, dated September 11, 1883.

Application filed November 7, 1882. (No model.)

*To all whom it may concern:*

Be it known that I, WILLIAM H. TURNER, a citizen of the United States, residing at Indianapolis, in the county of Marion and State of Indiana, have invented certain new and useful Improvements in Attachments for Harvesters, of which the following is a specification.

My invention relates to attachments for harvesters, to be used for the purpose of facilitating the transportation of said harvesters. I attain this object by the mechanism illustrated in the accompanying drawings, in which—

Figure 1 is a top view, showing frame-work and bull-wheel of harvester with my attachments ready for transportation. Fig. 2 is a longitudinal vertical section through frame of harvester, on line $x\ x$ on Fig. 1. Fig. 3 is a vertical cross-section on line $y\ y$ on Fig. 1, showing bull-wheel in position in front of axle and between hounds, ready for transportation. Fig. 4 shows details of attachments for spindle of grain-wheel, by which the grain-wheel is used to support the rear part of the frame when the harvester is being transported, thus doing away with the extra caster-wheel in general use.

The hounds D, the axle E, on which turn wheels G G, and the blocks F F are bolted together with bolts $f f$. The "bull-wheel" B of harvester rests between the hounds and immediately in front of and contiguous to axle E, making a sufficient and the only connection between the axle and the harvester. The frame-work $a\ a$ of harvester A is not bolted or fastened to the axle E, but kept in place on axle E by its own weight, the blocks F F on axle E preventing lateral motion of harvester during transportation. Socket J is used on spindle L of the harvester, from which grain-wheel H has been taken to form a spindle for bracket K. Said bracket K is to receive the grain-wheel H between the arms $k'\ k'$, the grain-wheel H being secured between said arms $k'\ k'$ by pintle $m$, thus forming a support for the rear end of harvester during transportation. The grain-wheel H of harvester is removed, and socket J, with spindle $j$, is secured in the place of grain-wheel. Said socket J is held in position and stayed by stay-rods $n\ n$, that are bolted to socket and to under side of longitudinal sills $a\ a$ of harvester-frame.

On bracket K is socket $k$, which is secured in place on spindle $j$ by a pin or bolt. The grain-wheel is secured in place between arms $k'\ k'$ of bracket K by pintle $m$.

When it is desired to transport any harvester, the blocks F F are bolted to the top of axle E by bolts $f f$. The hounds D are secured to the under side of axle E by the same bolts, $f f$. The harvester is lifted from the ground and set on axle E, so that the longitudinal sills $a\ a$ of harvester-frame rest between blocks F F, thus preventing lateral motion of harvester. The bull-wheel B of harvester rests between hounds D immediately in front of and contiguous to axle E. The grain-wheel H is removed from spindle L, and in its place socket J is secured to spindle L with the same pin or bolt used with grain-wheel. Socket J is stayed by bolting stay-rods $n\ n$ to sides of socket and to under side of longitudinal sills $a\ a$ of harvester-frame. The bracket K is secured to spindle $j$ of socket J. Then the grain-wheel H is secured between arms $k'\ k'$ of bracket K with pintle $m$. The harvester is then transformed into a three-wheeled vehicle, with the addition to original machine of but two wheels and an axle, and it can be transported as desired.

What I claim, and desire to secure by Letters Patent, is—

1. The combination, in a truck for harvesters, of the hounds D D, axle E, wheels G G, blocks F F, and bolts $f f$, said axle adapted to support the front and rear sills of the harvester between said blocks F F, the space between the axle and the hounds adapted to receive the main wheel of the harvester, substantially as described, and for the purpose set forth.

2. The combination, in harvesters, of grain-wheel spindle L, socket J, with spindle $j$, stay-rods $n\ n$, bracket K, with socket $k$ and arms $k'\ k'$, grain-wheel H, and pintle $m$, substantially as described, and for the purpose set forth.

In testimony whereof I have signed my name to this specification in the presence of two subscribing witnesses.

WILLIAM H. TURNER.

Witnesses:
   BERNH. J. LIZIUS,
   GOTTFR. KOEHLER.